United States Patent [19]
Wallerstorfer et al.

[11] Patent Number: 5,478,995
[45] Date of Patent: Dec. 26, 1995

[54] DATA CARRIER WITH DISC SHAPED CARRIER STRUCTURE

[75] Inventors: Kurt Wallerstorfer, Strasswalchen; Wolfram Kocznar, Innsbruck; Robert Gruber, Salzburg, all of Austria

[73] Assignee: Skidata Computer Gesellschaft M.b.h., Gartenau, Austria

[21] Appl. No.: 302,229

[22] Filed: Sep. 8, 1994

Related U.S. Application Data

[63] Continuation of Ser. No. 983,975, Dec. 1, 1992, abandoned, which is a continuation-in-part of Ser. No. 918,881, Jul. 23, 1992, abandoned, which is a continuation of Ser. No. 623,969, Feb. 8, 1991, abandoned, and Ser. No. 911,269, Jul. 7, 1992, Pat. No. 5,202,550, which is a continuation of Ser. No. 392,534, Jun. 23, 1989, abandoned.

[30] Foreign Application Priority Data

| Oct. 23, 1986 | [AT] | Austria | 2818/86 |
| Oct. 23, 1986 | [AT] | Austria | 2819/86 |
| Oct. 23, 1986 | [AT] | Austria | 2820/86 |
| Aug. 8, 1988 | [AT] | Austria | 1987/88 |
| Nov. 9, 1988 | [AT] | Austria | 2743/88 |

[51] Int. Cl.$^6$ ........................................... G06K 5/00
[52] U.S. Cl. .................. 235/382; 235/382.5; 340/825.31
[58] Field of Search ..................................... 235/380, 382, 235/382.5; 340/825.54, 825.31; 343/895; 24/8, 318, 598.4, 598.6

[56] References Cited

U.S. PATENT DOCUMENTS

| 1,359,083 | 11/1920 | McKellar . | |
| 1,530,684 | 6/1921 | Manborgne et al. | 343/895 |
| 2,527,090 | 10/1950 | Bauman | 224/4 |
| 2,644,853 | 7/1953 | Berninger et al. | 174/52 |
| 3,055,400 | 1/1961 | Frappe | 24/598.4 X |
| 3,719,974 | 3/1973 | Abrams et al. | 24/237 |
| 3,766,452 | 10/1973 | Burpee et al. | 194/214 |
| 3,806,874 | 4/1974 | Ehrat | 340/149 R |
| 4,245,486 | 1/1981 | Matsumoto et al. | 63/23 |
| 4,325,146 | 4/1982 | Lennington | 455/604 |
| 4,338,587 | 7/1982 | Chiappetti | 340/32 |
| 4,388,524 | 6/1983 | Walton | 235/380 |

(List continued on next page.)

FOREIGN PATENT DOCUMENTS

| 1184658 | 3/1985 | Canada . |
| 0058029 | 8/1982 | European Pat. Off. . |
| 0057603 | 8/1982 | European Pat. Off. . |
| 0061373 | 9/1982 | European Pat. Off. . |
| 0019280 | 9/1984 | European Pat. Off. . |
| 0142013 | 5/1985 | European Pat. Off. . |
| 0168836 | 1/1986 | European Pat. Off. . |
| 0198642 | 10/1986 | European Pat. Off. . |
| 0196028 | 10/1986 | European Pat. Off. . |
| 0086286 | 11/1986 | European Pat. Off. . |
| 0089087 | 6/1987 | European Pat. Off. . |
| 0246374 | 11/1987 | European Pat. Off. . |
| 0257688 | 3/1988 | European Pat. Off. . |
| 17303 | of 1903 | United Kingdom . |
| 2151987 | 7/1985 | United Kingdom . |
| 2164825 | 3/1986 | United Kingdom . |
| 8303694 | 10/1983 | WIPO . |
| 8604705 | 8/1986 | WIPO . |

*Primary Examiner*—Donald T. Hajec
*Assistant Examiner*—Jeffrey R. Filipek
*Attorney, Agent, or Firm*—Lorusso & Loud

[57] ABSTRACT

A data carrier for a non-contact data communication with a control station controlling a passage to an area or space comprises a carrier base structure, a data sending-receiving unit, a non-volatile, electrically erasable and programmable memory, a liquid crystal display for displaying data, and a solar cell unit for providing power. When the data carrier is approached to the control station, data are received from and transmitted to the control station which checks and/or changes the data content of the memory. A means for making visible the stored data on the liquid crystal display, e.g. a microprocessor, and the liquid crystal display are powered by the solar cell unit. The data carrier can be designed as a disk and handled like a coin. A housing of the data carrier can be provided with a cord wound on a spring acted spool.

18 Claims, 7 Drawing Sheets

U.S. PATENT DOCUMENTS

| | | | |
|---|---|---|---|
| 4,399,437 | 8/1983 | Falck et al. | 235/380 X |
| 4,476,468 | 10/1984 | Goldman | 340/825.034 |
| 4,501,958 | 2/1985 | Glize et al. | 235/380 X |
| 4,555,618 | 11/1985 | Riskin | 235/384 |
| 4,582,985 | 4/1986 | Lofberg | 235/380 |
| 4,593,412 | 6/1986 | Jacob | 343/820 X |
| 4,701,601 | 10/1987 | Francini et al. | 235/380 X |
| 4,748,601 | 5/1988 | Reidt et al. | 368/10 |
| 4,754,418 | 6/1988 | Hara | 235/380 X |
| 4,766,293 | 8/1988 | Boston | 235/380 X |
| 4,853,524 | 8/1989 | Yamaguchi et al. | 235/468 |
| 4,976,548 | 12/1990 | Tschanz | 368/277 |
| 5,103,081 | 4/1992 | Fisher et al. | 235/375 X |
| 5,147,021 | 9/1992 | Maruyama et al. | 235/381 X |
| 5,149,945 | 9/1992 | Johnson et al. | 235/380 |
| 5,166,502 | 11/1992 | Rendleman et al. | 235/492 |
| 5,350,945 | 9/1994 | Hayakawa | 257/679 |
| 5,354,975 | 10/1994 | Ishibashi et al. | 235/380 |

DATA CARRIER WITH DISC SHAPED CARRIER STRUCTURE

This is a continuation of application Ser. No. 07/983,975 filed on Dec. 1, 1992, now abandoned which was a continuation-in-part of Ser. No. 07/918,881 filed Jul. 23, 1992, now abandoned, (FWC of Ser. No. 07/623,969 filed Feb. 8, 1991), now abandoned and of Ser. No. 07/911,269 filed Jul. 7, 1992, now U.S. Pat. No. 5,202,550 (FWC of Ser. No. 07/392,534 filed Jun. 23, 1989), now abandoned.

BACKGROUND OF THE INVENTION

The invention concerns a data carrier for a non-contact communication with a control station which controls a passage to an area space by checking an/or changing data of authorization of passage, when the data carrier is presented to the control station. Such data carriers have various applications like in ski lifts to check or validate tickets, in parking garages to authorize entry or exit, etc. and can be worn like a wrist watch to facilitate approaching to the control station. An example shows U.S. Pat. No. 4,501,958.

The data carrier shown therein comprises an alterable memory as well as a display making visible the altered data contained in the memory. A battery contained in the data carrier supplies the memory and the display with power. The non-contact data transmission is effected by means of ultrasonics.

A first object of the invention is to make a battery for the power supply unnecessary in a data carrier of the aforementioned kind.

A further object is to limit the data transmission to a maximum distance of about 30 cm to eliminate errors caused by several data carriers approaching the control station in close sequence.

Further, it should be possible to wear a data carrier of this kind anywhere on the clothing so that the user will also be able to wear his watch as usual.

It is a further object of the invention to provide a data carrier which is similar to a coin for control stations in the form of a coin machine into which the data carrier can be inserted like a coin.

SUMMARY OF THE INVENTION

A data carrier for a non-contact communication with a control station comprises a carrier base structure, a non-volatile, electrically erasable and programmable memory designed to store the data of authorization of passage;

a data sending-receiving unit for receiving data from the control station and transmitting data to the control station;

a liquid crystal display for displaying data;

a means for making visible on the liquid crystal display the data stored in the memory; and a solar cell unit for providing power to the liquid crystal display and to the means for making visible the data on the liquid crystal display.

For the use of the data carrier similar to a coin the carrier structure base is designed as a disk.

Further embodiments provide that the data carrier further comprises a housing holding the carrier base structure a spool mounted in the housing so that it can turn, under spring tension, a cord wound on the spool, that can be pulled out of the housing against spring force, the cord having a first end projecting out peripherally of the housing and a second end fixed on the spool, a first fastening element provided on the projecting first end of the cord, and a second fastening element mounted on the housing.

The first fastening element can be secured on a piece of clothing. The data carrier can then be approached to a control station, whereby the card automatically adapts to the currently required length. Therefore, the card is no hindrance when participating in different types of sports since the cord which is under spring tension rewinds on the spool after use and is held in close contact with the piece of clothing.

Embodiments of the invention will now be described in more detail with reference to the accompanying drawings.

DETAILED DESCRIPTION OF THE INVENTION

Figure 1:
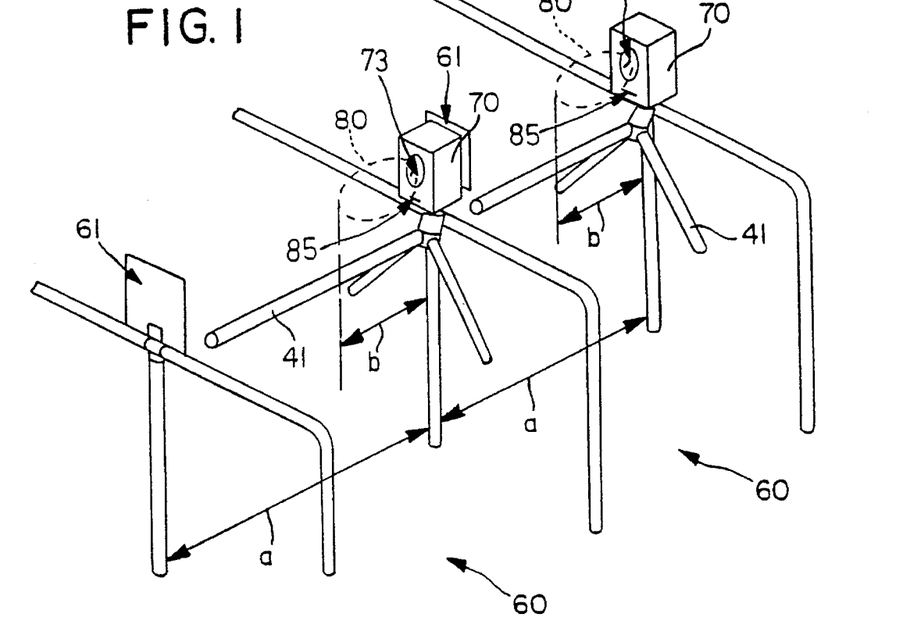
FIG. 1 shows a dual-lane control area comprising two control stations.

FIG. 1 shows an access control device provided with two control stations 70. An area 80 surrounding each control station 70 consists of a communication space, provided for a contact-free communication with a data carrier 50 to be checked. This area 80 lies within an access space 60 for people with limits 61, the dimensions of which match the person carrying the data carrier 50. For example, each access space 60 consists of a through lane with a width a provided with a turnstile 41. The surrounding area 80 has a maximum reach b considerably smaller than the width a of the access space 60. For data transmission between a data carrier 50 and the control station 70, the data carrier 50 must be approached to the control station 70 to an extent that interference in communication by another data carrier that is accidentally or even intentionally present in the access space 60 is practically impossible. If the width a is, for example, between 50 to 70 cm, a recommended maximum reach b for the surrounding area 80 is around 10 to 30 cm. Additional, the control station 70 is provided with a slot 85 to insert magnetic or bar-coded cards.

Preferably the data transmission is done via radio, where the small reach b mentioned can be attained primarily by a low sending power and recommended antenna design. The sending/receiving frequencies are preferably in the area of up to 250 kHz and under. According to FIG. 2, two single antennae 16 are used for sending and receiving data. The antennae 16 are both located in the data carrier 50 at 90° to one another, so that they do not have too strong a magnetic influence on each other.

Radio communication between the control station 70 and the data carrier 50 which has been brought into the surrounding area 80 will be explained in greater detail by means of both block diagrams in FIGS. 17 and 18 of the data carrier 50 and the control station 70.

Figure 17:
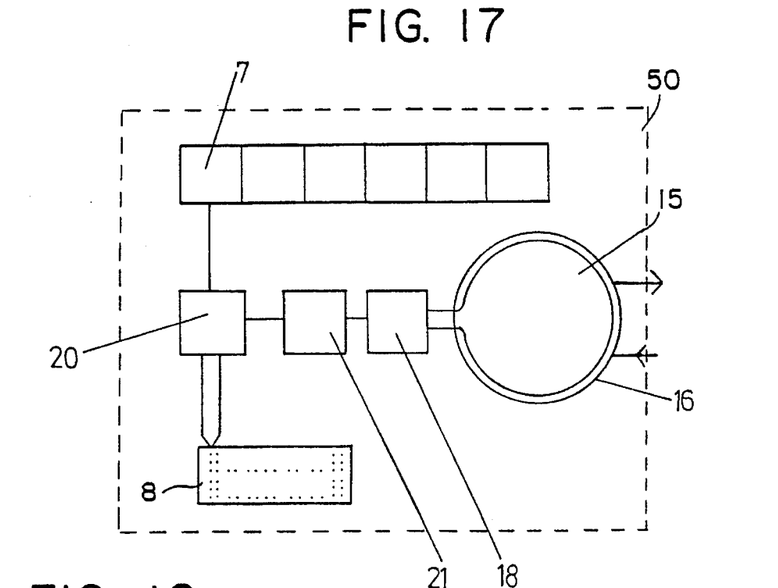
Figure 18:
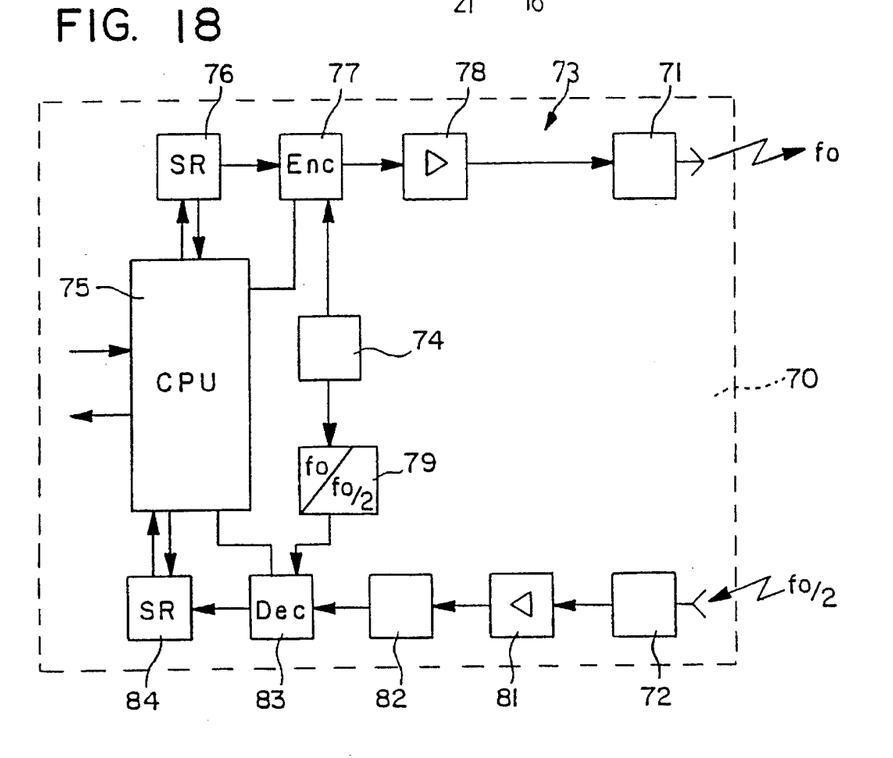

The electronic components contained in the data carrier 50 are obvious in the block diagram in FIG. 17. A nonvolatile electrically erasable programmable memory (EEPROM) 21 is connected to a sending-receiving unit 15 comprising antennae 16 and a sending-receiving logic 18, and to a means 20 comprising a central processing unit (CPU) for making visible data stored in the memory 21 on a liquid crystal display 8. The means 20 for making visible the data content of the memory 21 and the liquid crystal display 8 are powered by a power source 7 comprising a solar cell unit.

The liquid crystal display 8 is in particular provided with an automatic stepping circuit so that different data can be repeatedly read one after the other, for example the value of the data carrier, the end of the validity period, details and information on the initialization and the entitled owner etc. A button 13 may be provided to step to the next display. Use of the data carrier is not restricted by time limits since it forms a self-sufficient, independent system, and it can be reprogrammed for reuse. It is also suitable for applications in which successive devaluation at each control station is done, until a "supply" corresponding to the purchase price is used up. Such a data carrier can be used, for example, as a multiple-ride ticket, an entry ticket for events with consumption potential (hotel industry, recreation and leisure areas, etc.). This design may have the advantage that a leftover notice can be posted on the display, where what is left conforms to the respective purpose of use, for example, notice of expiration date, notice of next-to-last trip ticket or the like, in order to make it possible to revalidate in time at an initialization station.

In a simple embodiment, means 20 are a mere interpreter, but they are preferably a microprocessor which fulfills additionally a control function. Memory 21 and sending and receiving logic 18 are supplied with power by the control station 70 via radio or infrared light transmission.

The control station 70 (FIG. 18) sends an ID number of a carrier frequency $f_o$ (for example, 100 kHz). For this, the central unit 75 (CPU) of the control station transmits corresponding data to a shift register 76 (SR), where it is read serially in an encoder 77. The encoder 77 is connected to an oscillator 74 for the carrier frequency $f_o$. The sending antenna 71 operates over a corresponding amplifier 78. The signals given by the control station 70 are received in the data carrier 50 by the antenna 16 specified on the carrier frequency.

The signals given by the data carrier 50 are received by the receiving antenna 72 of the control station 70. From there, they go via an amplifier 81 and a lowpass filter 82 to decoder 83.

From the decoder, the data goes into a shift register 84 in the central unit 75. This calculates the data received with the same algorithm as the data carrier 50 and can recognize any attempts at manipulation. When a frequency divider 79 is assigned to the sending oscillator 74, a sending frequency $f_o/2$ from the data carrier 50 can thus be compared directly.

Each data carrier 50 has a housing which consists of a lower part or first shell 1 and an upper part or second shell 2. The housing consists especially of plastic, and both parts 1,2 move the advantage of being banded by screwed together. The lower part or first shell 1 of the housing can be designed in various shapes.

Figure 2:
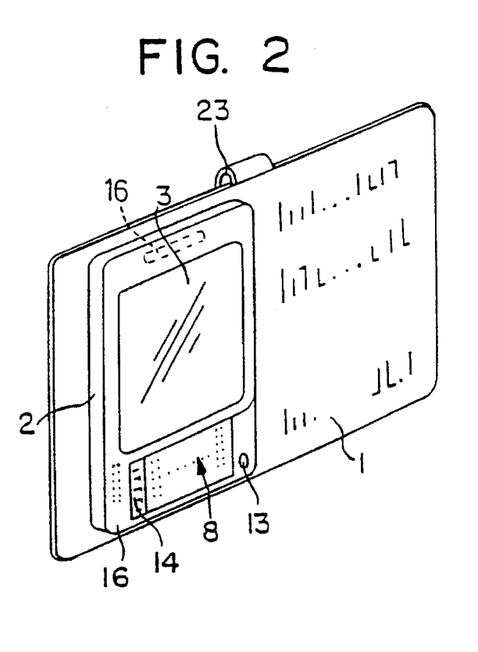
FIG. 2 an oblique view of a first version of a data carrier to be presented to a control station, FIG. 3 a longitudinal section across a second version of a data carrier, FIG. 4 a top view of a third version of a data carrier, FIG. 5 a longitudinal section across a data carrier according to FIG. 4, FIG. 6 a view of the rear side of a fourth version of a data carrier, FIG. 7 a side view of a data carrier according to FIG. 6
Figure 3:
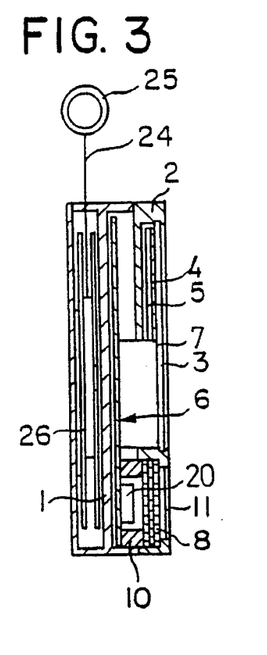

FIG. 2 shows an enlarged lower part 1 in the shape of a card with a pin 23 where an extra field of writing can be attached on the lower part 1. According to FIG. 3 the housing is designed as a key holder, where a cord 24 is fastened to a key ring 25 and is wound on a spool 26 rotatably mounted in the first shell 1.

Figure 4:
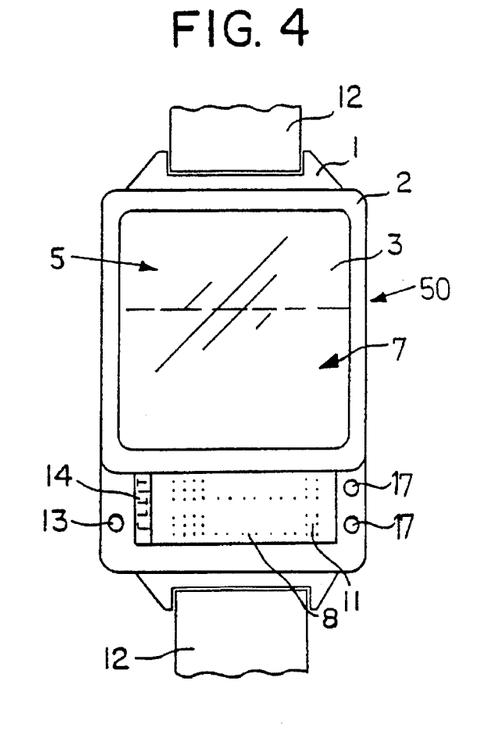
Figure 5:
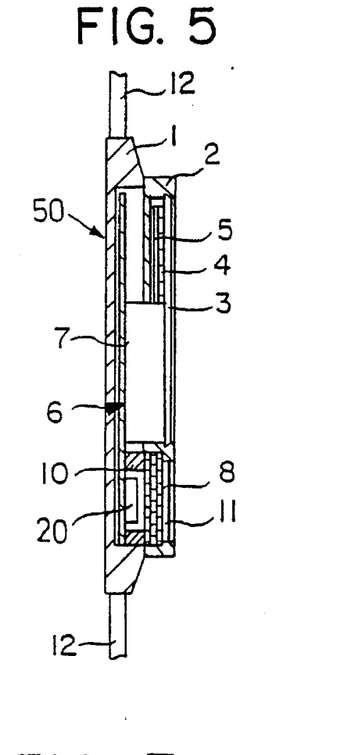

FIGS. 4 and 5 show a design of a data carrier for optical data transmission, especially via infrared waves. The sending-receiving unit 15 comprises infrared sending and receiving diodes 17 which communicate with a corresponding sending-receiving unit of the control station 70.

On the first shell 1 there is a place for a wristband 12 so that the data carrier 50 can be worn like a wrist watch. The upper part or second shell 2 has a recess for a photo 5 or the like which is locked in by a transparent first cover 3. On the inside, a first area of the first cover 3 has a self-sticking layer 4 to which the photo 5 is adhered. The type of adhesive is chosen so that removing the photo 5 will destroy it and exchanging one photo for another will be apparent. Behind a second area of the transparent first cover 3 there is arranged the solar cell unit 7 for powering the display 8 and the central processing unit 20. A transparent second cover 11 in the upper part or second shell 2 covers the liquid crystal display 8. Next to the display 8 are the infra red light emitting diodes 17 of the sending-receiving unit 15 for inputting and outputting data. A button 13 which serves to make the data contained in the data carrier 50 visible on the display 8, and a number field 14 containing a visually legible, individual number can be provided next to the display 8. The number can also be placed on the first cover 3 or on the photo 5. The display 8 is connected via a contact element 10 with the control processing unit 20 arranged on a carrier base structure 6. During utilization of the data carrier 50, its visually legible, individual number of field 14 is coded with the valid dates of the data carrier 50 and arranged in numerical order respectively in an external memory, e.g. the memory of an initialization station. Since the data carrier 50 is designed for long-term multiple applications, the earlier data are erased upon each new initialization.

Figure 6:
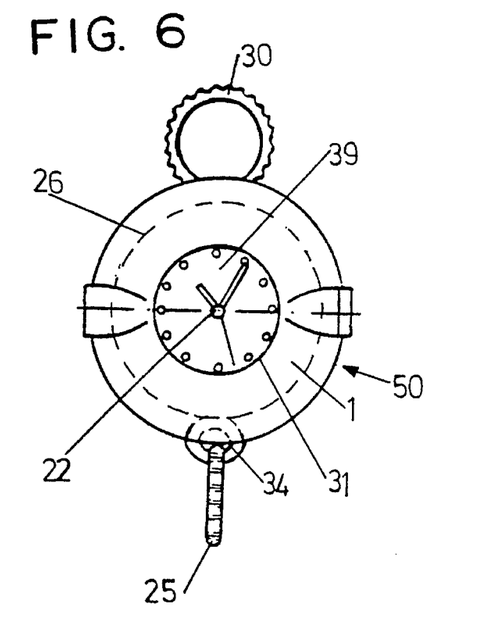

FIG. 6 shows the back or lower side of a fourth version of a data carrier. The lower part or first shell 1 comprises an outside recess 31, into which a watch 39 is inserted. The two shells 1, 2 are connected via a snap connection 33 (see FIG. 9) formed by a ring groove and a ring bead, and can be separated again. Additionally, a connecting screw 44 (FIGS. 15, 20) also can be provided. The setting shaft of the clockwork 39 is moved toward the outside through a lateral channel and screwed on with the winding button.

In the inside of the upper part or second shell 2, a spool 26 is mounted so it can turn around an axis 22 and prestressed by a spiral spring 46. On spool a cord 24 is wound, the first end of which is pulled outward through a radial cutout in the second shell 2 and connected to an eye 34, and the second end of which is attached rigidly to the spool 26. The cord 24 can be pulled by hand against the spring force, out of the housing and is automatically pulled back. As can be seen from FIGS. 6 and 7, a key ring 25 as a first fastening element is attached to the eye 34. For partial nesting of the eye 34 the peripheral wall of the second shell 2 is provided with a recess. A second fastening element 30 is attached to the second shell 2.

Figure 7:
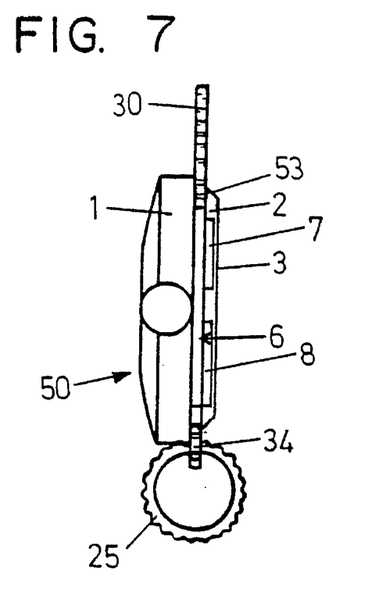

Using the second fastening element 30 the housing can be hung on a piece of clothing. In this way, the cord 24 that can be pulled out against spring force is useful for other purposes. For example, a key, a ticket 45 or other often-used objects can be fastened on the cord 24, that are in this way easy to use and held on the outside of the body so that they can not be lost.

Figures 8, 9, 10:
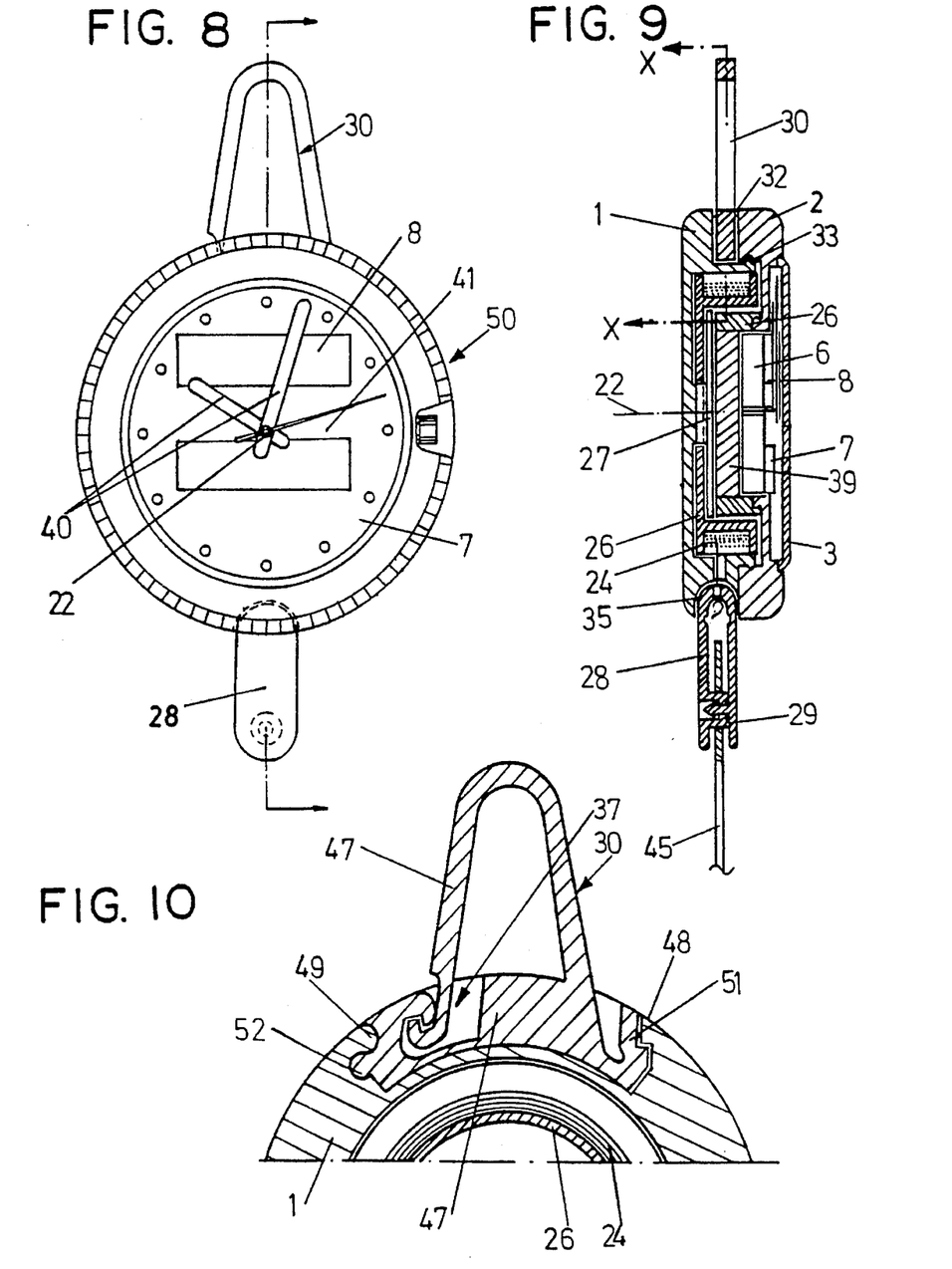
FIG. 8 a top view of a fifth version of a data carrier
FIG. 9 a longitudinal section of a data carrier according to FIG. 8.
FIG. 10 a partial cross section along line X—X in FIG. 9.

FIGS. 8 and 9 show that a first fastening element 28 can also be fastened directly to the cord 24. The first fastening element 28 is formed by a closure comprising a button lock 29. With the cord 24 wound up, the first fastening element 28 lies in a form-fitting way in a recess 35 of the peripheral wall of the first shell 1 for position stabilizing. The spool 26 which is under spring tension is rotatably mounted in the lower part or first shell 1. The upper part or second shell 2 has a receiving part 36 which engages with spool 26 and into which a clockwork 39 is inserted. The driving shafts for the hands 40 extend centrally through the carrier base structure 6 which is covered by a protective film 41 forming a transparent dial. The liquid crystal display 8 and the solar cell unit 7 are visible through the transparent protective film 41. The second fastening element 30 is in this embodiment formed by a closeable, U-shaped hook which is lockable in a circumferential recess 37 of the first shell 1.

FIG. 10 shows an embodiment in which the second fastening element 30 is replaceably held in recess 37. The second fastening element 30 is in this embodiment provided with a base part 47 at which hooks are arranged. The base part 47 is placed in the recess 37 in the peripheral wall of the housing and engages on one side with an elastic latch 51 with a projection 48 of the peripheral wall and on the opposing side with a bar 52 with projection 49 formed as a rounded rib of the peripheral wall. The latch 51 can be pulled back in the direction of the base part 47 from the rear engagement area of recess 37, so that the base part 47 is unlocked at this point. The rounded rib of the projection 49 on the opposing side of the projection 48 forms a swivel bearing so that the base part 47 can be swung upward after unlocking the latch 51 until the bar 52 can be pulled out under the rib.

If the first fastening element 28 is fastened to a piece of clothing of the wearer, the data carrier can be pulled out and approached to the control station, and is then automatically pulled back.

Figure 14:
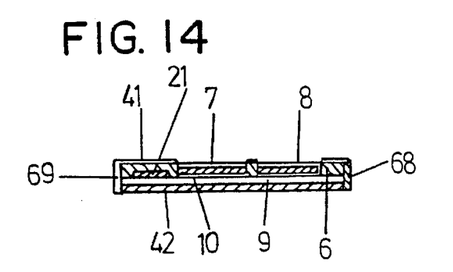

In the embodiment shown in FIGS. 11 to 15, the carrier base structure 6 has the form of a coin which is circumferentially enclosed by a metallic ring 68. The ring 68 is interrupted by a slot 69. The carrier base structure 6 comprises in corresponding recesses the liquid crystal display 8, the solar cell unit and a number of solar cells as power source 7, the memory 21 formed by an $E^2PROM$ and the microprocessor 20. As shown in FIG. 14, both sides of the carrier base structure 6 are covered by a protective film 41, 42, the protective film 41 comprising windows 43 for the LCD 8 and the solar cells 7 but covering the microprocessor 20 and the memory 21. The antenna 16 of the sending-receiving unit 15 is helically printed on the rear side of the carrier base structure 6, as can schematically be seen in FIG. 13. The metallic ring 68 reinforces and stiffens the carrier base structure 6, which is for example made of plastic material, so that it can be handled like a coin, data and energy transmission being possible because of slot 69. Hence, in this embodiment the carrier base structure forms even without a surrounding housing a usable data carrier which can like a coin be inserted into a slot of a coding and/or reading station. The value of the data carrier can like a coin represent a certain amount. Due to the possibility of making changes in the memory 21, the value can also be reduced, however. The coin form of the data carrier allows the same handling as in the case of usual coins (counting, collecting, destacking, classifying, checking etc.) so that current devices can be used. In parking garages, a data carrier of this kind can be inserted into the exit gate, when one leaves the garage, and it can again be given to someone entering the garage.

Figure 11:
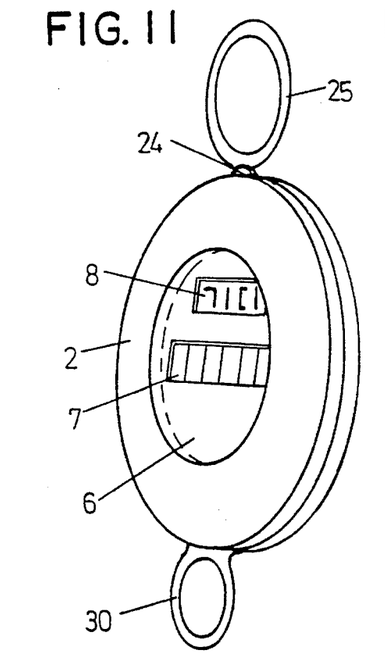
FIG. 11 an oblique view of a sixth version of a data carrier.
Figure 12:
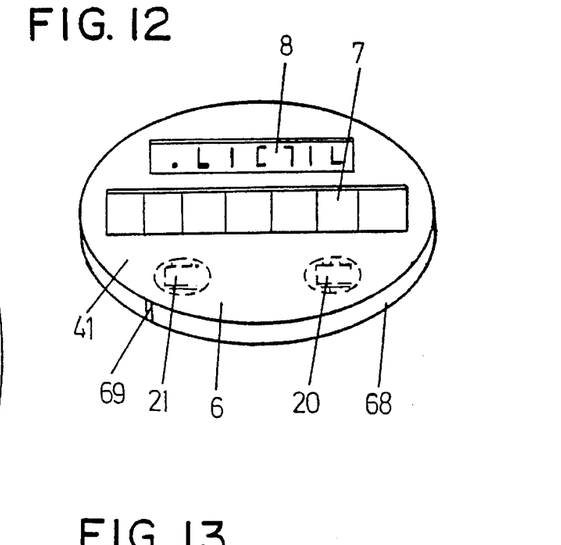
FIG. 12 an oblique view of a carrier base structure of the data carrier according to FIG. 11, FIG. 13 a back view of a carrier base structure according to FIG. 12, FIG. 14 a cross section of the carrier base structure according to FIG. 12, FIG. 15 a longitudinal section of a data carrier according to FIG. 11, FIG. 16 a partial cross section of a seventh version of a data carrier, FIG. 17 a block diagram of a data carrier, FIG. 18 a block diagram of a control station, FIG. 19 schematical steps of producing data carrier structures of FIG. 12, FIG. 20 a cross section of an eighth version of a data carrier, FIG. 21 a top view of a first version of a first fastening element of a data carrier, FIG. 22 the first fastening element of FIG. 21 from the other side, FIG. 23 a section along line XXIII—XXIII of FIG. 22, and FIG. 24 a top view of a second version of a first fastening element of a data carrier.
Figure 13:
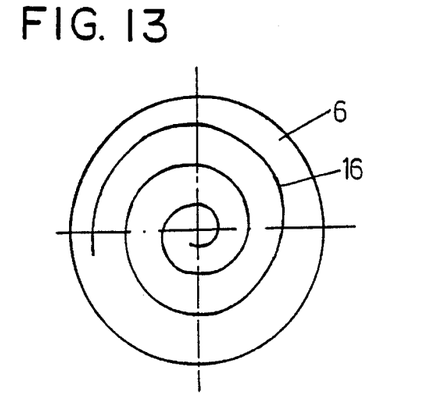
Figure 15:
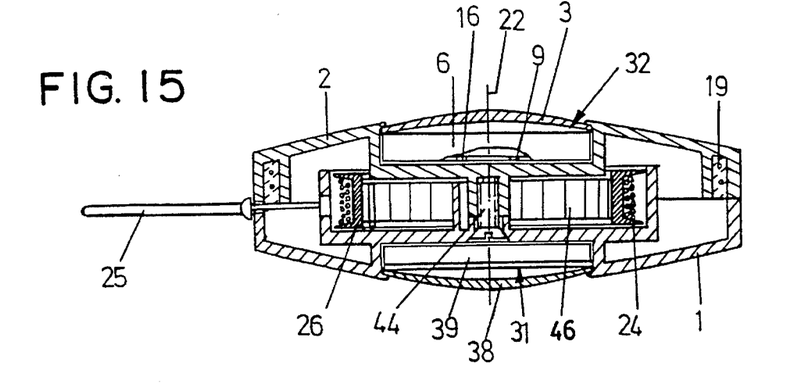

According to FIGS. 11 and 15, the carrier base structure 6 is mounted in a two-part housing in which a spring-loaded spool 26 is rotatably arranged The two parts or shells 1, 2 are connected by a screw 44. The cord 24 is extractable from the spool 26, the free end of the cord carrying the first fastening element or key ring 25 by means of which the cord 24 can be fixed, for example, to the clothing of the holder. Both shells 1, 2 of the housing have a central recess 31, 32, a clockwork 39 being inserted in the first recess 31 and the shell 2 of the carrier base structure 6 being inserted in the second recess 32. Each recess is closed by means of a transparent cover 3, 38. Instead of the clockwork 39 or in addition thereto, a picture of the holder can be arranged under cover 38. Since the reach of the sending-receiving unit may be too limited because of the antenna 16 which is helically printed on the rear side of the carrier base structure, the upper part or second shell 2 comprises an antenna extension 19 which ends in the region of recess 32 and is connected with contacts 9 provided at the rear side of the carrier base structure 6, when the latter is being inserted. Said contacts are positioned under the protective layer 42 and are laid base before the structure base carrier 6 is inserted into the recess.

Figure 16:
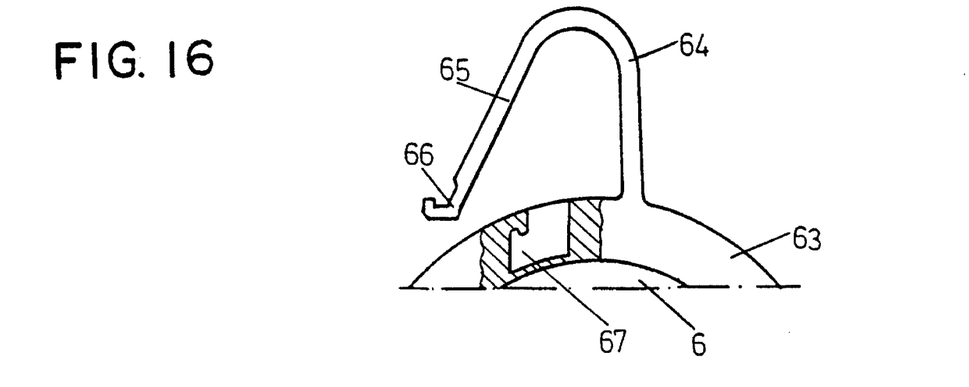

FIG. 16 shows another version of a housing of the carrier base structure 6, that is designed in the form of a ring 63. On the ring 63, the first shank 64 of a U-shaped fastening hook is formed. The second shank 65 of the fastening hook can be spread open elastically and has a hook-shaped lock 66 on its end. In ring 63, a radial cutout 67 is provided in which a locking element corresponding to the lock 66 is mounted. In this way, the fastening hook can be opened easily and closed securely so that this data carrier, too can be fixed to a piece of clothing.

Figure 19:
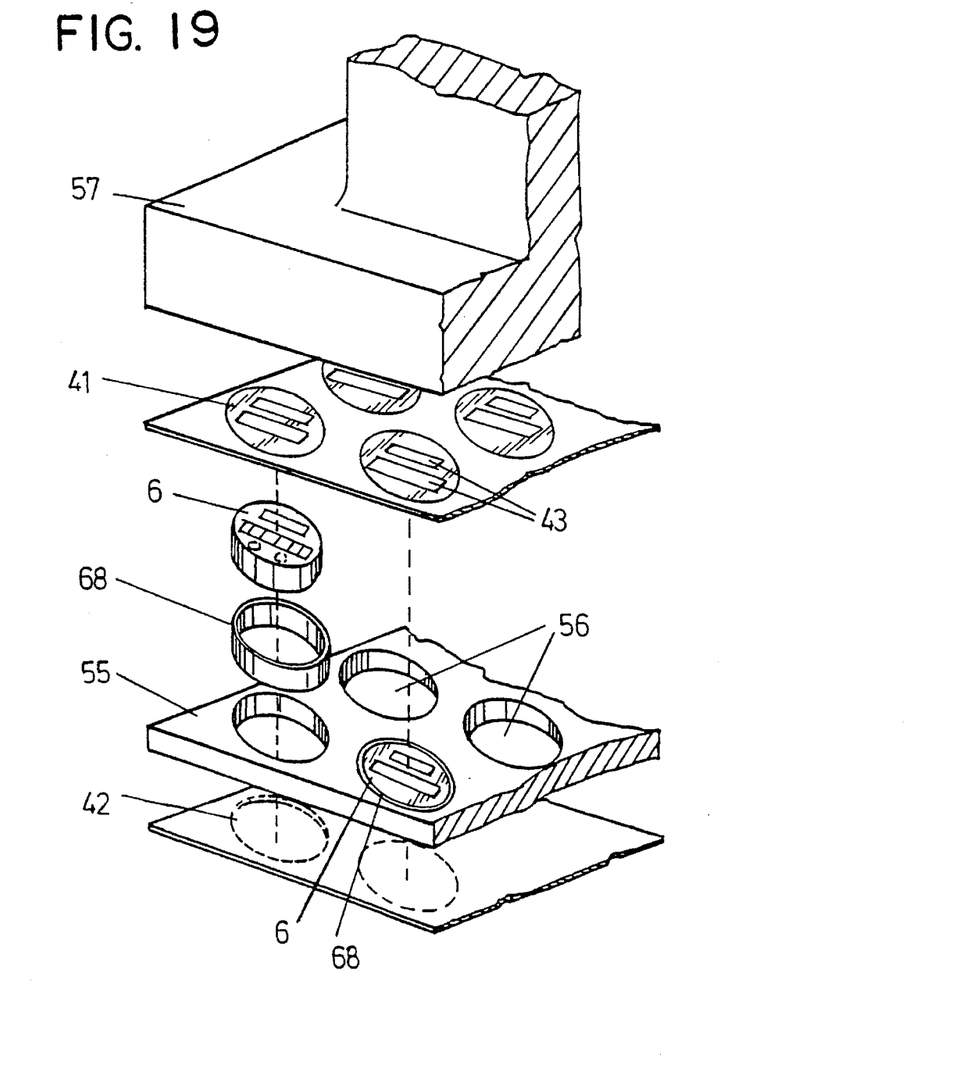

As shown in FIG. 19, carrier base structures 6 can be made in a simple manner, i.e. rings 68 are inserted into a carrier plate 55 which has holes 56, and disks provided with electronic modules are inserted into said carrier plate. A film forming the protective layer 42, the carrier plate 55 and a film forming the protective layer 41 and comprising window 43 are then placed into a mold and melted under heat and pressure by means of a schematic die 57 to produce coated carrier base structures 6 The ring 68 punches both protective layers 41, 42 out of the films.

Figure 20:
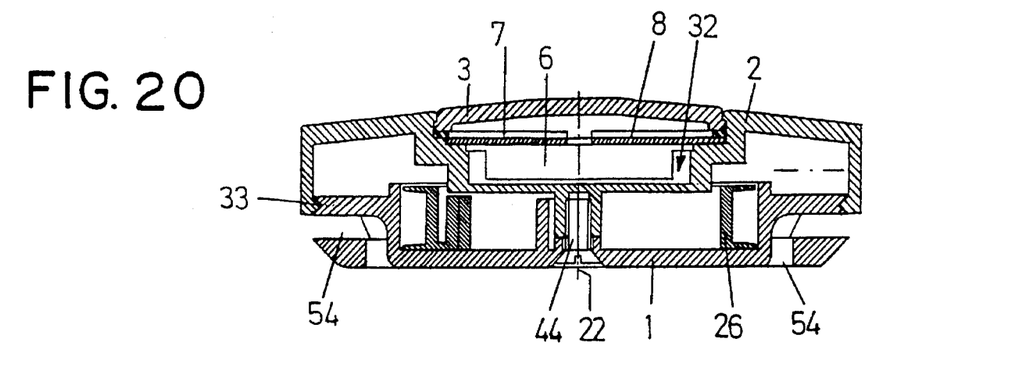
Figure 21:
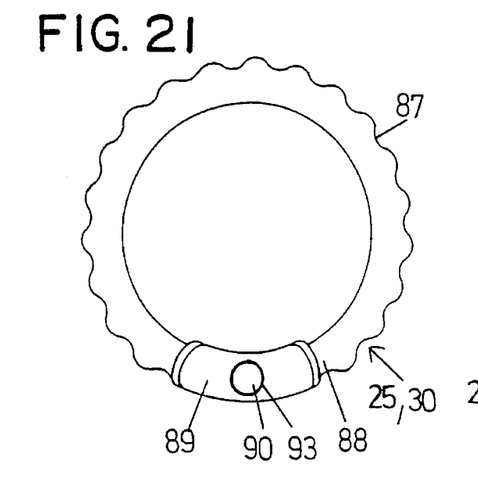
Figure 22:
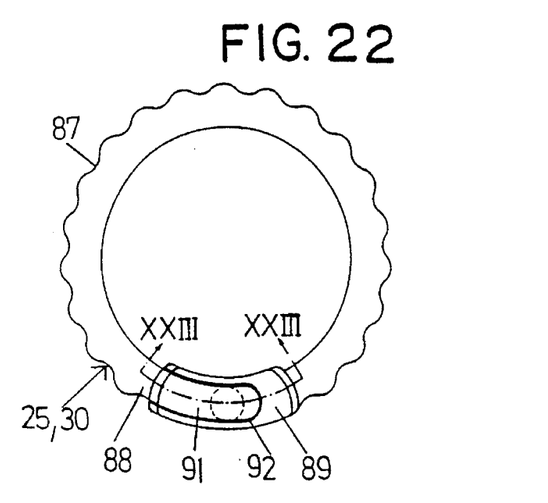
Figure 23:
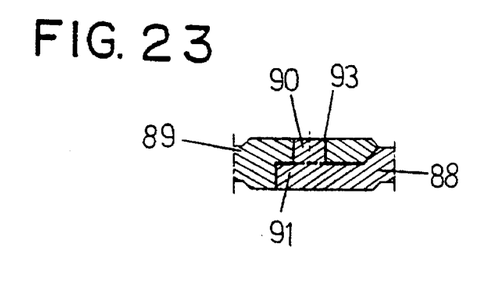

The data carrier as shown in FIG. 20 has a structure similar to the one illustrated in FIG. 9. The housing comprises the lower part or first shell 1 and the upper part or second shell 2, the carrier base structure 6 again being arranged in outside recess 32 of the second shell and covered by transparent cover 3.

Additional slots 54 are diametrically opposed to each other in the lower part or first shell i and extend between the peripheral wall, and the peripheral area of the outside of the first shell 1. A wirstband 12 as shown in FIG. 4 can be fastened on the slots 54, for example clamped on or pulled through.

FIGS. 21 to 24 show a first version of a fastening ring used as key ring or first fastening element 25 in FIGS. 3, 6, 7, 11 and 15 which encircles a bar 53 (FIG. 7), or used as a second fastening element 30 in FIGS. 6, 7 and 11 which is installed in the eye 34. The fastening ring consists of plastic and is divided so that it has two ends 88, 89. In the version according to FIGS. 21 to 23, the first end 88 is provided with a flattened area 91 from which a locking pin 90 projects perpendicular to the ring plane. The second end 89 is formed so that it is thickened and provided with a groove 92, the depth of which corresponds to the thickness of the flattened area 91 of the first end 88. Corresponding to the locking pin 90, the second end 89 exhibits an opening 93 in the base of the groove 92, in which the locking pin 90 can be installed. The opening 93, preferably formed as a bore hole, is widened on the outside so that an end bead not shown of the locking pin 90 can engage.

Figure 24:
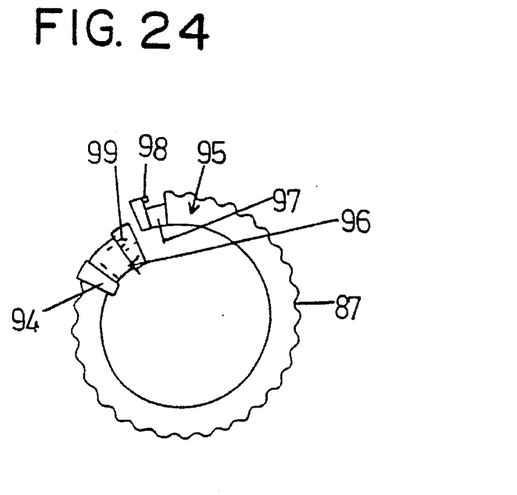

FIG. 24 shows a second version of a fastening ring. The ends 95 and 96 of this fastening ring are spread open elastically and exhibit locking elements that can connect to each other. On the first end 95, flattened areas 97 parallel to the ring plane are provided on both sides. Additionally, on the circumference, there is a recess provided which a projection 98 turned away from the first end 95. The second end 96 exhibits a thickened area 94 in which a cutout comprising an undercut 99 is provided for holding the first end 95. By pressing together the ring, the flattened areas 97 of the first end 95 can be introduced into the cutout of the second end 96 and locked with its projection 98 in the undercut 99. The fastening ring is easy to manufacture and exhibits no moving parts of joints. A waviness 87 on the outer circumference makes usage easier when opening and closing.

We claim:

1. A data carrier for a non-contact data communication with a control station, the control station being provided with a coin handling device, which comprises an encoder/decoder and a slot, and controlling a passage to an area or space by checking and/or changing data of authorization of passage on the data carrier by said encoder/decoder when the data carrier is inserted into said slot of the coin handling device, the data carrier comprising:

a carrier base structure having the form of a disk adapted to be handled in the manner of a coin by said coin handling device;

a non-volatile, electrically erasable and programmable memory designed to store the data of authorization of passage;

a data sending-receiving unit for receiving data from the control station and transmitting data to the control station;

a liquid crystal display for displaying data;

a central processing unit for making visible on the liquid crystal display the data stored in the memory; and a solar cell unit for providing power to the liquid crystal display and to the means for making visible the data on the liquid crystal display.

2. A data carrier according to claim 1, wherein the central processing unit for making visible the data comprises a microprocessor, the microprocessor further comprising means for controlling operations of the data carrier.

3. A data carrier according to claim 1, wherein the two sides of the disk are covered with protective films each protective film including window in the region of said liquid crystal display and said solar cell.

4. A data carrier according to claim 1, wherein the sending-receiving unit is designed for radio transmission with a carrier frequency field up to 250 kHz.

5. A data carrier according to claim 4, wherein the sending-receiving unit has a magnetic antenna.

6. A data carrier according to claim 5, further comprising;

a housing holding the disk-shaped carrier base structure, the housing being provided with an antenna extension connected to a bare contact of said antenna, a spool mounted in the housing so that it can turn, under spring tension, a cord wound on the spool, that can be pulled out of the housing against spring force, the cord having a first end projecting out peripherally of the housing and a second end fixed on the spool, a first fastening element provided on the projecting first end of the cord, and a second fastening element mounted on the housing.

7. A data carrier according to claim 6, wherein the housing comprises a first and a second shell turnably connected to each other.

8. A data carrier according to claim 7, wherein the first shell comprises an outside having a recess, a watch being provided in the recess and having a watch movement, display elements, and a watch crystal.

9. A data carrier according to claim 6, wherein the first fastening element is a spreadable key ring.

10. A data carrier according to claim 9, wherein the projecting first end of the cord is fastened to an eye, and the key ring is placed in the eye.

11. A data carrier according to claim 9, wherein the key ring is made of plastic and is provided with a first and a second end comprising locking elements that can be connected to each other.

12. A data carrier according to claim 1, further comprising a recess for receiving a picture of the owner.

13. A data carrier according to claim 1, further comprising;

a housing having a first and a second shell turnably connected to each other, said second shell comprising an outside having a recess holding the disk-shaped carrier base structure, a spool mounted in the housing so that it can turn, under spring tension, a cord wound on the spool, that can be pulled out of the housing against spring force, the cord having a first end projecting out peripherally of the housing and a second end fixed on the spool, a first fastening element provided on the projecting first end of the cord, and a second fastening element mounted on the housing.

14. A data carrier for a non-contact data communication with a control station, the control station being provided with a coin handling device, which comprises an encoder/decoder and a slot, and controlling a passage to an area or space by checking and/or changing data of authorization of passage on the data carrier by said encoder/decoder when the data carrier is inserted into said slot the coin handling device, the data carrier comprising:

a carrier base structure having the form of a disk adapted to be handled in the manner of a coin by said coin handling device;

a non-volatile, electrically erasable and programmable memory designed to store the data of authorization of passage; a data sending-receiving unit for receiving data from the control station and transmitting data to the control station, said sending-receiving unit being designed for radio transmission with a carrier frequency field up to 250 kHz, and having a magnetic antenna;

a liquid crystal display for displaying data;

a central processing unit for making visible on the liquid crystal display the data stored in the memory; and a solar cell unit for providing power to the liquid crystal display and to the central processing unit for making visible the data on the liquid crystal display;

the liquid crystal display and the solar cell unit being arranged on a first side of the disk-shaped base structure, and the magnetic antenna being arranged on the second side of the disk-shaped base structure.

15. A data carrier according to claim 14, wherein the disk-shaped base structure is made of plastic, the magnetic antenna being printed helically on the second side of the disk-shaped base structure.

16. A data carrier according to claim 14, wherein the circumference of said disk is enclosed by a metallic ring interrupted by a slot.

17. A data carrier for a non-contact data communication with a control station, the control station being provided with a coin handling device and controlling a passage to an area or space by checking and/or changing data of authorization of passage on the data carrier when the data carrier is presented to the control station, the data carrier comprising;

a carrier base structure having the form of a disk adapted to be handled in the manner of a coin, and being made of plastic, the circumference of said disk-shaped base structure being enclosed by a metallic ring interrupted by a slot;

a non-volatile, electrically erasable and programmable memory designed to store the data of authorization of passage;

a data sending-receiving unit designed for radio transmission with a carrier frequency field up to 250 kHz for receiving data from the control station and transmitting data to the control station, the sending-receiving unit having magnetic antenna;

a liquid crystal display for displaying data;

a central processing unit for making visible on the liquid crystal display the data stored in the memory; and a solar cell unit for providing power to the liquid crystal display and to the central processing unit for making visible the data on the liquid crystal display.

18. A data carrier for a non-contact data communication with a control station, the control station being provided with a coin handling device and controlling a passage to an area or space by checking and/or changing data of authorization of passage on the data carrier when the data carrier is presented to the control station, the data carrier comprising;

a carrier base structure having a form of a disk adapted to be handled in the manner of a coin;

a non-volatile, electrically erasable and programmable memory designed to store the data of authorization of passage;

a data sending-receiving unit for receiving data from the control station and transmitting data to the control station;

a liquid crystal display for displaying data;

a central processing unit for making visible on the liquid crystal display the data stored in the memory;

a solar cell unit for providing power to the liquid crystal display and to the central processing unit for making visible the data on liquid crystal display, and;

a ring surrounding the disk-shaped base structure and provided with a U-hook, the first shank of which is rigidly connected to the ring and the second shank of which has a lock on the end that can be connected with a corresponding locking element in the ring.

* * * * *